UNITED STATES PATENT OFFICE 2,311,548

POLYMERS OF AMIDES OF ALPHA-METHYLENE MONOCARBOXYLIC ACIDS

Ralph Albert Jacobson, Landenberg, Pa., and Charles Joseph Mighton, Wilmington, Del., assignors to E. I. du Pont de Nemours & Company, Wilmington, Del., a corporation of Delaware No Drawing. Application April 28, 1939,
Serial No. 270,652

1 Claim. (Cl. 260—84)

This invention relates to synthetic resins and more particularly to resinous polymers and interpolymers of N-alkylamides of alpha-methylene aliphatic monocarboxylic acids.

This invention has as an object the preparation of new resinous polymers and interpolymers. A further object is the preparation of hard, tough, craze-resistant, interpolymers of N-alkylamides of alpha-methylene aliphatic monocarboxylic acids with other polymerizable organic compounds containing a methylene ($CH_2$) group attached by an ethylenic double bond to a carbon atom which is in turn attached to at least one negative group. A further object is the preparation of a polystyrene rendered craze-resistant by interpolymerization with polymerizable N-alkylamides of alpha-methylene aliphatic monocarboxylic acids. Another object is the preparation of materials useful in casting compositions, as packaging materials, dye assistants and the like. Other objects will appear hereinafter.

These objects are accomplished by the following invention wherein an amide of an alpha-methylene aliphatic monocarboxylic acid having at least one hydrogen on an atom alpha to the CO carbon and at least one open chain aliphatic hydrocarbon radical on the nitrogen atom is polymerized either alone or with a polymerizable monomeric organic compound containing a methylene ($CH_2$) group attached by an ethylenic double bond to a carbon atom which is in turn attached to at least one negative group.

Examples A, B, and C below illustrate some of the methods whereby the monomeric amides may be prepared.

EXAMPLE A

To a stirred, ice-cooled solution of one mole of the amine (see Table I for specific examples) dissolved in 142 parts of ethyl ether are added dropwise during a period of 1.5 to 2 hours, 104.5 parts of methacrylyl chloride and a solution of 40 parts of sodium hydroxide dissolved in 100 parts of water. The resulting suspension is stirred for an additional 0.5 hour, separated, and the water layer extracted with an additional 36 parts of ether. The combined ether extract containing the amide is washed with two—50 part portions of 2% aqueous sodium hydroxide solution, then with 25 parts of water, dried over anhydrous magnesium sulfate, and finally distilled under atmospheric pressure to remove the ether. The liquid residue is distilled under reduced pressure to isolate the monomeric amide. The yields in Table I are based on the amount of amide present in the distillate obtained in this way.

Table I

| Amine | Amide | Amide Yield | Boiling point |
|---|---|---|---|
| | | Per cent | |
| Methylamine | N-methylmethacrylamide | 90 | 100°/10 mm. |
| Butylamine | N-butylmethacrylamide | 86 | 118°/10 mm. |
| 2-ethylhexylamine | N-(2-ethylhexyl) methacrylamide | 85 | 151°/12 mm. |
| "Lorol" amine [1] | N-"Lorol" methacrylamide | 75 | 135–185°/2 mm. |
| Octadecylamine | N-octadecylmethacrylamide | 85 | 190°/3 mm. |
| Allylamine | N-allylmethacrylamide | 85 | 80°/2 mm. |
| β-Dimethylaminoethylamine | N-(β-dimethylaminoethyl)-methacrylamide | 73 | 121°/11 mm. |
| ω-Dimethylaminohexylamine | N-(ω-dimethylaminohexyl)-methacrylamide | 65 | 162°/5 mm. |
| ε-Aminocapronitrile | N-(ε-cyanopentyl)-methacrylamide | 87 | 180°/4 mm. |

[1] By "Lorol" amine is meant the mixture of higher primary aliphatic amines in which the alkyl groups correspond in carbon content and composition to the fatty acids occurring naturally in coconut oil.

EXAMPLE B

In exactly the way described in Example I, acrylyl chloride is reacted with amines to produce N-alkyl acrylamides (see Table II).

Table II

| Amine | Amide | Amide Yield | Boiling point |
|---|---|---|---|
| | | Per cent | |
| Methylamine | N-methylacrylamide | 71 | 84°/3 mm. |
| Diethylamine | N,N-diethylacrylamide | 50 | 93°/19 mm. |

EXAMPLE C

To a stirred, ice-cooled solution of 23 parts of hexamethylenediamine in 71 parts of ether are added dropwise 41.6 parts of methacrylyl chloride and a solution of 18 parts of sodium hydroxide dissolved in 32 parts of water. The insoluble hexamethylenedimethacrylamide formed is filtered off and washed with water to remove sodium chloride. The product is dried and then crystallized from toluene yielding 30.2 parts of a white powder, M. P. 115°, representing a yield of 60% of the theoretical amount of hexamethylenedimethacrylamide.

The more detailed practice of the polymerization process is illustrated by the following examples, wherein parts given are by weight. There are of course many forms of the invention other than these specific embodiments.

EXAMPLE I

*Preparation of cast polymers*

Twenty parts of N-methylmethacrylamide and 0.2 part of benzoyl peroxide are heated to 50 to 60° C. for 20 hours, causing the monomer to polymerize to a clear, solid mass. The polymer is baked at 100° for an additional 14 hours. A chip of the resulting polymer is very hard and softens at 205° C. The material is insoluble in benzene and in dioxan; but is soluble in dimethylformamide.

The polymers listed in Table III are prepared as described above.

Table III

| Polymer | Softening point | Solubility |
|---|---|---|
| N-butylmethacrylamide | Deg. 155 | Insoluble in toluene and dioxan. Soluble in dimethylformamide. |
| N-(2-ethylhexyl)-methacrylamide | 80 | Soluble in toluene. |
| N-"Lorol" methacrylamide | 25 | Soluble in toluene. |
| N-octadecylmethacrylamide | 25 | Do. |
| N-allylmethacrylamide | | Insoluble in toluene and butyl acetate. |
| N-(ε-cyanopentyl)-methacrylamide | | Soluble in dimethylformamide. |

The N-butylmethacrylamide polymer above, prepared by polymerizing the monomer is insoluble in toluene and dioxan and contains 9.3% nitrogen whereas the polymer prepared by reacting polymethacrylyl chloride with n-butylamine is soluble in toluene and dioxan and contains 7.3% nitrogen.

EXAMPLE II

*Preparation of powdery polymers*

(a) A solution of 25 parts N-methylmethacrylamide and 0.25 part of benzoyl peroxide in 173 parts of toluene is heated under reflux for two hours. The polymer, which precipitates out as formed, is filtered and washed with hot toluene. The resulting white powder is soluble in water and is molded to a transparent, almost colorless chip.

EXAMPLE III

Ten parts of N,N-diethylacrylamide and 0.1 part of benzoyl peroxide were heated to 140 to 150° C. for 0.5 hour causing the monomer to polymerize to a soft, light-colored resin. In the same way, N-methylacrylamide polymerizes to a light-colored resin which softens at 20° C. Both polymers are soluble in toluene.

EXAMPLE IV (a) N-(β-dimethylaminoethyl)-methacrylamide is polymerized by dissolving the monomer in an equivalent amount of dilute acetic acid, diluting with water to 10% monomer concentration, adding 1%, based on the monomer, of 30% hydrogen peroxide, and heating at 100° C. for 16 hours. The viscous polymeric salt solution is poured into warm 3% sodium bicarbonate solution and the resulting solution boiled gently for 1 hour to precipitate the polymeric free base. The polymer is filtered, washed, and dried.

(b) In the same way, N-(ω-dimethylaminohexyl)-methacrylamide is polymerized.

In both cases, the yield of the dried, free base polymer is 93%. The products are soluble in dilute aqueous acids and in dimethylformamide, but are insoluble in toluene and in water.

EXAMPLE V (a) A mixture of 80 parts of monomeric methyl methacrylate, 20 parts of N-methylmethacrylamide, 1 part benzoyl peroxide, and 200 parts of a 0.3% aqueous solution of neutralized interpolymer of methyl methacrylate and methacrylic acid is placed in a reactor equipped with an efficient stirrer, a reflux condenser, and a thermometer. The mixture is heated, with stirring, on a steam bath for 45 minutes. Refluxing begins at 87° C. and at the end of the run the temperature reaches 93° C. The granular interpolymer (yield 83%) molds to a clear, hard disc softening at 130° C. Polymeric methyl methacrylate, polymerized and molded under the same conditions, softens at 110° C. The interpolymer described above, moreover, is insoluble in toluene whereas polymeric methyl methacrylate is soluble in toluene.

(b) A molded disc of an interpolymer of 10% N-(2-ethyl-hexyl)-methacrylamide-90% methyl methacrylate similarly prepared in 82% yield, softens at 110° C.

(c) A granular interpolymer of 10% N-methylmethacrylamide-90% styrene similarly prepared in 82% yield except that the mixture is heated at 65–70° C. for 20 hours and no refluxing takes place, molds to a clear, hard disc softening at 85° C. Polystyrene, prepared in 95% yield by this method, softens at 78° C.

(d) A granular interpolymer of 10% N-methylmethacrylamide-90% vinyl acetate similarly prepared except that refluxing occurs at 67° C. and heating is continued for 7 hours causing the temperature to rise to 83° C. at the end of the run, molds to a clear disc softening at 38° C. Polymeric vinyl acetate, prepared in this way, softens at 30° C.

EXAMPLE VI

A mixture of 60 parts of 2-chlorobutadiene-1,3, 15 parts of hexamethylenedimethacrylamide, 0.75 part benzoyl peroxide, and 82 parts toluene is heated at 80° C. for 5 hours. The resulting clear, solid gel is washed with alcohol, then milled on rolls. This yields 64 parts of a somewhat sticky product which, after compounding with zinc and magnesium oxides and curing is swollen less when immersed in kerosene than unmodified polymeric 2-chlorobutadiene-1,3 similarly treated.

EXAMPLE VII (a) A solution of 2 parts of N-methylmethacrylamide in 18 parts of methyl methacrylate containing 0.2 part benzoyl peroxide is heated to 60° C. for 14 hours, causing the mixture to polymerize to a clear, solid mass. The polymer, after baking at 100° C. for an additional 14 hours, is tough, hard, and bubble-free, and softens at 135° C. In a similar experiment, unmodified methyl methacrylate, polymerized under these conditions, is full of bubbles and softens at 125° C. The interpolymer described above, moreover, is insoluble in toluene and in dioxan, whereas polymeric methyl methacrylate is soluble in both these solvents.

(b) A similarly prepared, bubble-free, casting of 25% N-butylmethacrylamide-75% methyl methacrylate interpolymer is insoluble in toluene and softens at 135° C.

(c) A similarly prepared, bubble-free, casting of 10% N-(2-ethylhexyl)-methacrylamide-90% methyl methacrylate interpolymer is soluble in toluene and softens at 125° C.

(d) A bubble-free casting of 25% N-"Lorol"-methacrylamide-75% methyl methacrylate interpolymer, similarly prepared, is soft and flexible at room temperature.

(e) A casting of 10% N-methylacrylamide-90% methyl methacrylate interpolymer, similarly prepared, is soluble in toluene and molds to a disc softening at 100° C.

(f) A casting of 10% hexamethylenedimethacrylamide-90% butyl methacrylate interpolymer similarly prepared, is insoluble in organic solvents and softens at 122° C.

(g) A similarly prepared interpolymer of 10% N-allylmethacrylamide-90% methyl methacrylate is insoluble in toluene and a chip softens at 125° C.

(h) A hard clear casting of 25% N-methylmethacrylamide-75% styrene interpolymer similarly prepared is insoluble in toluene and softens at 115° C. Polystyrene, prepared in this way, is soluble in toluene and softens at 90° C.

(i) A clear casting of 10% N-butylmethacrylamide-90% styrene similarly prepared softens at 90° C.

(j) A similarly prepared casting of 5% N-allylmethacrylamide-95% styrene interpolymer is insoluble in toluene and a molded disc softens at 95° C. The product is not crazed by acetone and is tougher than polystyrene.

EXAMPLE VIII

A casting consisting of 5% hexamethylenedimethacrylamide-95% styrene interpolymer is prepared as in Example VII except that the mixture is heated to 95° C. and becomes solid in 2 hours. The interpolymer is insoluble in toluene and softens at 82° C. When a shaped piece of the interpolymer is treated with acetone and the acetone allowed to evaporate, the treated surface shows no crazing. The interpolymer is also resistant to crazing even upon prolonged outdoor exposure. Unmodified styrene requires 7 hours to polymerize under the same conditions, and the polymer is soluble in toluene, softens at 82° C., and is readily crazed either with organic solvents or upon outdoor exposure. Impact strength measurement, moreover, show the interpolymer to be considerably tougher than unmodified polystyrene.

EXAMPLE IX

A mixture of 9 parts vinyl acetate, 1 part hexamethylenedimethacrylamide, 0.1 part benzoyl peroxide, and 5 parts of methanol is heated at 65° C. The interpolymer begins to precipitate out after one hour and the heating is continued for an additional 1 hour. The product molds to a disc softening at 86° C.

In the practice of this invention, there may be used any amide of an alpha-methylene organic monocarboxylic acid, preferably aliphatic, providing that the amide has at least one hydrogen atom on an atom alpha to the carbonyl carbon atom and at least one open chain aliphatic radical attached to the nitrogen atom including, in addition to the amides used in the examples, those of alpha-ethylacrylic acid, alpha-propylacrylic acid, alpha-isopropylacrylic acid, alpha-amylacrylic acid, alpha-phenylacrylic acid, alpha-cyclohexylacrylic acid, alpha-(methylcyclohexyl) acrylic acid, alpha-(methylphenyl)-acrylic acid, etc.

When the amide is one of acrylic acid, both amido hydrogens may be replaced by open chain aliphatic radicals but when the alpha carbon of the acid has all its valences attached to carbon, the amide must have one hydrogen on the nitrogen. While in certain cases an amide excluded from the scope of the present invention, such as N,N-diethylmethacrylamide may be interpolymerized, e. g., with methyl methacrylate, the amide alone is not polymerizable under conditions effective to polymerize the amides of the present invention. Amides of these acids having not more than four carbon atoms, e. g., acrylic and methacrylic acids are distinctly preferred.

Any monomeric open chain aliphatic amine having at least one hydrogen on the nitrogen, i. e. any amine including diamines and other polyamines having at least one primary or secondary amino group may be used to react with the monomeric acrylic or other acid chloride, anhydride, etc., the amine being so chosen that there is in the resulting monomeric amide at least one hydrogen on an atom directly attached to the CO carbon. There can thus be used mono- and dialkylamines, aliphatic diprimary, disecondary, primary secondary, primary tertiary, primary secondary diamines and analogous triamines and other polyamines. Amines containing functional groups unreactive with the acid or acid derivative used to effect amide formation, e. g., multiple bonds, cyano, tertiary amino, alkoxy, thioalkoxy, ester, amide, nitro, halide, ketone, aldehyde, and thio acid may be used. Amines containing functional groups reactive with the acid or acid derivative, e. g., amines containing hydroxy or thiol groups may be used to produce a hydroxy or thiol amide or an ester or thioester amide as desired.

Specific amines in addition to those already indicated include propargylamine, β-aminopropionitrile, ethyl-β-aminopropionate, 2-bromoethylamine, 2,3-dichloropropylamine, aminoacetamide, 4-amino-2-butanone, aminomethyl ethyl sulfide, methyl aminothioacetate, β, β'-diaminoethyl sulfide, diethanolamine, ethanolamine, γ-mercaptopropylamine, and aminosuccinimide. The invention also includes within its scope amides from imines of the type

R—CH=NH including imines containing other functional groups, e. g., 3-iminovaleronitrile and ethyl 3-iminobutyrate. The resulting imide should have at least one hydrogen on an atom directly attached to the CO carbon, i. e., the amide is an N-alkyl acrylimide.

Oxygen yielding catalysts, for example, benzoyl peroxide, are particularly suitable for use in promoting the reaction, although it is possible to operate in the absence of a catalyst. The polymerizations are generally sluggish at low temperatures and require temperatures in the neighborhood of 50–150° C., the use of the range 60° to 65° being particularly suitable. The polymerization may be carried out at atmospheric, sub- or superatmospheric pressures.

The polymerization of the amides may be carried out in bulk or in the presence of a suitable diluent. The diluent can be a liquid in which the monomeric amide is insoluble, in which case a dispersing agent and effective stirrer are used and a granular product is obtained. The diluent can be a solvent for the monomer and a non-solvent for the polymer, in which case a fine, powdery product is generally obtained. It is possible, also, to use a diluent in which the monomer and polymer are soluble, and to use the resulting polymer in solution or to separate the polymer by evaporating the solvent or by mixing with a liquid in which the polymer is insoluble.

While the aminomethacrylamides, such as for example, N-(β-dimethylaminoethyl)-methacrylamide, can be polymerized by heat treatment in the presence of an oxygen yielding catalyst, e. g., benzoyl peroxide, it has been found desirable to use the method described by J. Harmon in U. S. P. 2,138,762 which involves the use of an acetic acid solution of the monomer with hydrogen peroxide as a catalyst.

In the process of the present invention, the monomeric amide as above specified is polymerized either alone or together with at least one other polymerizable organic compound containing a methylene (CH$_2$) group attached by an ethylenic double bond to a carbon atom which is in turn attached to at least one negative group, for example, a compound having the radical

and having at least one of the free valences thereof satisfied by halogen, ether oxygen, sulfide sulfur, a radical containing a multiply bonded carbon atom removed from the

by not more than one chain atom, or ester oxygen separated from the

by not more than one chain atom. Any polymerizable organic compound containing a methylene (CH$_2$) group attached by an ethylenic double bond to a carbon atom which is in turn attached to at least one negative group may be interpolymerized with the N-alkylamides of the present invention including methyl acrylate, methacrylonitrile, octyl methacrylate, acrylonitrile, vinyl propionate, vinyl butyrate, methyl vinyl ketone, butadiene, isoprene, vinyl acetate, methyl methacrylate, allyl and methallyl borates, silicates, carbonates, phthalates, etc., silicon methacrylates and acrylates, and of course, a dissimilar acryl- or methacrylamide.

The preparation of interpolymers with polymerizable organic compounds containing a methylene (CH$_2$) group attached by an ethylenic double bond to a carbon atom which is in turn attached to at least one negative group can be carried out by any of the methods described above. The proportion of amide used may be varied widely, mixtures having been prepared from 0.1 to 50% amide. For the lower members of the series, an increase in softening point is obtained as the proportion of amide is increased.

The initial proportions of the various components used in preparing the interpolymers may be varied within wide limits. While polymeric products can be prepared outside such ranges, the amount of N-alkyl alpha-methylene monocarboxylic acid amide may constitute from 1% to 99%, and preferably from 10% to 50% of the interpolymer. Even as little as 1% of material interpolymerized may show striking differences in properties. Thus, the interpolymer of 1% N-allylmethacrylamide-99% styrene is insoluble in toluene whereas polystyrene is soluble in toluene. The exact proportions chosen in any one case depends upon the nature of the materials being interpolymerized. In the case of interpolymers of N-methylmethacrylamide and methyl methacrylate, it is preferred that the N-methylmethacrylamide constitute from 5% to 20% of the interpolymer while in the case of hexamethylenedimethacrylamidestyrene interpolymers, it is preferred that the hexamethylenedimethacrylamide constitute from 5% to 10% of the interpolymer. These are the preferred interpolymers. The preferred N-alkyl alpha-methylene monocarboxylic amides are N-methylmethacrylamide and hexamethylenedimethacrylamide.

The polymers and interpolymers of the present invention may be formulated into compositions containing organic solvents, water, or organic non-solvents with emulsifying agents, plasticizers, pigments, driers, waxes, dyes, cellulose derivatives, and natural or synthetic resins.

The lower members of the series, for example, N-methylmethacrylamide are useful in preparing hard, high-softening, colorless, tough interpolymers with methyl methacrylate and with styrene. The bifunctional derivatives, i. e., the alpha-methylene carbonamides of amines having two amino groups containing hydrogen, e. g., hexamethylenedimethacrylamide, are useful in preparing tough, craze-resistant interpolymers with styrene and with methyl methacrylate. Polymers of the higher members of the series, such as N-"Lorol" methacrylamide, are compatible with paraffin, forming tough films for packaging purposes. Polymers of the aminomethacrylamides, for example, N-(ω-dimethylaminohexyl)-methacrylamide, are useful as dyeing assistants for cellulose acetate. Interpolymers of hexamethylenedimethacrylamide or N-butylmethacrylamide with 2-chlorobutadiene-1,3 are more resistant to kerosene than unmodified polymeric 2-chlorobutadiene-1,3.

Polymeric methacrylamide is infusible and is either soluble in or swelled by water. Most of the polymeric N-alkyl methacrylamides are fusible and not affected by water. It is possible to choose the N-substituent so as to give polymers of especially desirable properties for particular applications. For example, polymeric methacrylamide is incompatible with paraffin, whereas polymeric N-"Lorol" methacrylamide is readily compatible with paraffin. N-substituted methacrylamides may be polymerized much more readily than the C-substituted compounds. For example, N-octylmethacrylamide is polymerized readily whereas it is doubtful if β-octylmethacrylamide would polymerize at all. Interpolymers of N-alkyl methacrylamides have improved properties over corresponding interpolymers of methacrylamide. The lower members of the series, particularly N-methylmethacrylamide, give interpolymers of improved softening points. For example, the interpolymer of 10% N-methylmethacrylamide with 90% methyl methacrylate softens at 135° C., as compared with a softening point of 120° C. for the corresponding methacrylamide interpolymer. The interpolymer of 10% N-methylmethacrylamide with 90% vinyl acetate softens 10° C. higher than unmodified polyvinyl acetate whereas methacrylamide inhibits completely the polymerization of vinyl acetate. The higher members of the series are flexibilizing agents, for example, the interpolymer of 25% N-"Lorol" methacrylamide with 75% methyl methacrylate is soft and flexible at room temperature.

The products of the present invention being produced from monomeric amides are free from the chloride salts which are by-products in the preparation of amides from polymeric acid chlorides and amines and therefore can be molded to glass clear products.

While in certain cases, the dialkyl methacrylamides, e. g., N,N-diethylmethacrylamide may be interpolymerized with methyl methacrylate, the amide alone is not polymerizable under conditions effective for polymerizing the corresponding N,N-dialkyl acrylamides and monoalkylmethacrylamides. The products of the present invention differ from those obtained by the reaction of polyacrylic acid esters with amines in that the latter process produces imides almost exclusively (see co-pending application Serial No. 93,720, filed July 30, 1936 now U. S. Patent 2,146,209). The process (polyacrylate esters+ amines) moreover has the disadvantage, which is common to practically all reactions involving pre-formed polymers, that it is difficult to secure complete reaction of all the functional groups present in the molecule of polymer. Thus, in the above named process, the product contains in addition to amide and imide groups, unreacted ester groups. As mentioned above, the process of the present invention yields polymers containing 100% amide groups only.

A particularly valuable feature and a preferred form of the present invention is the preparation of craze-resistant styrene interpolymers, particularly from amides derived either from diamines or from unsaturated monoamines. Resistance to crazing is determined by allowing acetone to evaporate at room temperature from the surface of a shaped piece of the product and examining the surface after evaporation of the acetone. If the surface shows minute irregular cracks, it is said to craze, while if free from such cracks, it is said to be non-crazing.

The above description and examples are intended to be illustrative only. Any modification of or variation therefrom which conforms to the spirit of the invention is intended to be included within the scope of the claim.

We claim:

The product of the interpolymerization of 20 parts of N-methylmethacrylamide with 80 parts of methyl methacrylate.

RALPH ALBERT JACOBSON.
CHARLES JOSEPH MIGHTON.